United States Patent
Liu

(10) Patent No.: US 12,426,101 B2
(45) Date of Patent: Sep. 23, 2025

(54) CELL RECONFIGURATION METHOD, NETWORK CONTROL NODE, AND MOBILE IAB NODE

(71) Applicant: VIVO MOBILE COMMUNICATION CO., LTD., Chang'an Dongguan (CN)

(72) Inventor: Jinhua Liu, Chang'an Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 495 days.

(21) Appl. No.: 17/835,155

(22) Filed: Jun. 8, 2022

(65) Prior Publication Data

US 2022/0377641 A1 Nov. 24, 2022

Related U.S. Application Data

(63) Continuation of application No. PCT/CN2020/135613, filed on Dec. 11, 2020.

(30) Foreign Application Priority Data

Dec. 12, 2019 (CN) .......................... 201911275304.8

(51) Int. Cl.
*H04W 76/10* (2018.01)
*H04W 36/00* (2009.01)
(Continued)

(52) U.S. Cl.
CPC ............ *H04W 76/10* (2018.02); *H04W 76/30* (2018.02); *H04W 36/0069* (2018.08); *H04W 88/08* (2013.01)

(58) Field of Classification Search
CPC . H04W 36/0069; H04W 76/10; H04W 76/30; H04W 88/08
See application file for complete search history.

(56) References Cited

U.S. PATENT DOCUMENTS

2013/0183971 A1  7/2013  Tamaki et al.
2016/0057604 A1* 2/2016  Luo ........................ H04W 48/10
                                            370/330

(Continued)

FOREIGN PATENT DOCUMENTS

CN       103533656 A    1/2014
CN       104812008 A    7/2015
(Continued)

OTHER PUBLICATIONS

Apple. CA based HO. 3GPP TSG-RAN WG2 Meeting #105, R2-1901842, Athens, Greece, Feb. 25, 2019-Mar. 1, 2019.
(Continued)

*Primary Examiner* — Melanie Jagannathan
(74) *Attorney, Agent, or Firm* — Stites & Harbison, PLLC; Jeffrey A. Haeberlin

(57) ABSTRACT

Embodiments of the present disclosure provide a cell reconfiguration method, a network control node, and a mobile IAB node. The method includes: performing a cell reconfiguration operation, where the performing a cell reconfiguration operation includes: configuring a mobile IAB node to configure a second cell as a secondary cell or a primary secondary cell of a terminal and to configure the second cell to establish a connection with the terminal; and configuring the mobile IAB node and the terminal to release a first cell. The second cell is a new cell created by the mobile IAB node or an existing cell of the mobile IAB node, and the terminal is a terminal that provides services to the first cell.

19 Claims, 6 Drawing Sheets

(51) Int. Cl.
*H04W 76/30* (2018.01)
*H04W 88/08* (2009.01)

(56) References Cited

U.S. PATENT DOCUMENTS

| | | | | |
|---|---|---|---|---|
| 2016/0278004 | A1* | 9/2016 | Agyapong | H04W 24/10 |
| 2017/0019822 | A1* | 1/2017 | Zhao | H04W 36/08 |
| 2017/0223699 | A1* | 8/2017 | Yasukawa | H04W 72/29 |
| 2018/0249461 | A1 | 8/2018 | Miao et al. | |
| 2020/0252847 | A1* | 8/2020 | Park | H04W 76/27 |
| 2021/0314838 | A1* | 10/2021 | Sheng | H04W 48/16 |
| 2021/0352607 | A1* | 11/2021 | Miao | H04W 56/0045 |
| 2021/0409978 | A1* | 12/2021 | Mackenzie | H04W 24/02 |
| 2022/0109998 | A1* | 4/2022 | Wei | H04W 16/10 |
| 2022/0361071 | A1* | 11/2022 | Awada | H04W 36/249 |
| 2023/0145711 | A1* | 5/2023 | Koskinen | H04W 36/0072 370/329 |
| 2025/0039802 | A1* | 1/2025 | Noh | H04W 52/146 |
| 2025/0056402 | A1* | 2/2025 | Ahmed | H04W 48/20 |
| 2025/0184789 | A1* | 6/2025 | Noh | H04W 72/231 |

FOREIGN PATENT DOCUMENTS

| | | |
|---|---|---|
| CN | 110167199 A | 8/2019 |
| EP | 3567923 A1 | 11/2019 |
| WO | 2019/032997 A1 | 2/2019 |
| WO | 2019/159107 A1 | 8/2019 |

OTHER PUBLICATIONS

ZTE. Discussion on IAB topology adaptation. 3GPP TSG-RAN WG2 NR AdHoc 1807, R2-1810211, Montreal, Canada, Jul. 2-6, 2018.

Technical Specification Group Radio Access Network. Study on Integrated Access and Backhaul (Release 16). 3GPP TR 38.874, Dec. 2018.

Samsung, "IAB Node Start Up and Topology Adaptation Procedures," 3GPP TSG-RANWG2 Meeting#102 R2-1807647, May 25, 2018.

Samsung, "Overview on IAB node setup (NSA)," 3GPP TSG-RAN WG3 Meeting #103 R3-190436, Mar. 1, 2019 See ISR.

Ericsson, "Discussion and Solution for Distributed PCI Selection," 3GPP TSG-RAN WG3 #106 R3-197412, Nov. 22, 2019.

China National Intellectual Property Administration, International Search Report issued in corresponding Application No. PCT/CN2020/135613 mailed Mar. 4, 2021.

* cited by examiner

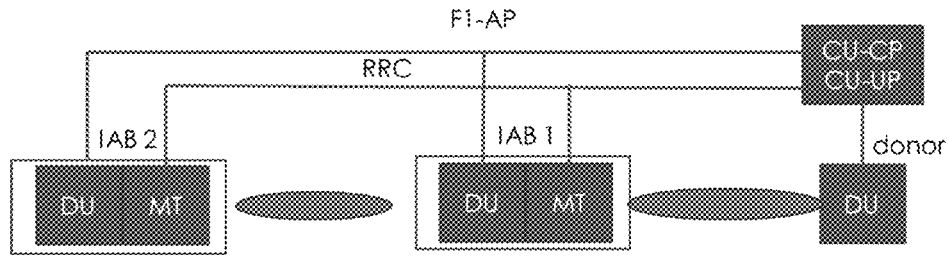

FIG. 3

Perform a cell reconfiguration operation — 41

FIG. 4

Configure the mobile IAB node to configure the second cell as a secondary cell or a primary secondary cell of the active terminal and to configure the second cell to establish a connection with the active terminal — 51

Configure the mobile IAB node to configure the second cell as a new primary cell — 52

Configure the mobile IAB node and the active terminal to release a first cell — 53

FIG. 5

CELL RECONFIGURATION METHOD, NETWORK CONTROL NODE, AND MOBILE IAB NODE

CROSS-REFERENCE TO RELATED APPLICATIONS

This application is a continuation of International Application No. PCT/CN2020/135613, filed on Dec. 11, 2020, which claims the priority of Chinese Patent Application No. 201911275304.8 filed in China on Dec. 12, 2019, the entire contents of which are hereby incorporated by reference.

TECHNICAL FIELD

Embodiments of the present disclosure relate to the field of wireless communication technologies, and in particular, to a cell reconfiguration method, a network control node, and a mobile IAB node.

BACKGROUND

With the development of modern mobile communication technology and transportation technology, people's demands for communication during transportation becomes increasingly strong. For example, people want to be able to work, watch videos or play games via Internet during high-speed transportation. To meet such demands, mobile Integrated Access Backhaul (Integrated Access Backhaul, IAB) self-backhaul technology has been developed. A mobile IAB node is a mobile self-backhaul relay base station that can be installed on a transportation vehicle (such as a train, a bus, or a ship) to provide passengers with instant messaging demands.

FIG. 1 shows an example of a mobile IAB node providing a wireless relay service to train passengers. In one aspect, with high power and adequate antenna performance, the IAB node can provide the passengers with large relay bandwidth. In another aspect, a cell provided by the mobile IAB node moves along with the passengers, and the passengers' user equipment (User Equipment, UE) enjoys adequate air interface channels and does not need to undergo frequent cell handovers, so that rates of the passenger's UE can be greatly improved, thereby avoiding service interruption caused by frequent cell handovers.

In some cases, it is necessary to reconfigure a cell for the mobile IAB node. How to reconfigure a cell without affecting services of active terminals in a cell is a problem that needs to be solved at present.

SUMMARY

Embodiments of the present disclosure provide a cell reconfiguration method, a network control node, and a mobile IAB node.

According to a first aspect of the present disclosure, a cell reconfiguration method performed by a network control node is provided, which includes:
  performing a cell reconfiguration operation, where the performing a cell reconfiguration operation includes:
  configuring a mobile IAB node to configure a second cell as a secondary cell or a primary secondary cell of a terminal and to configure the second cell to establish a connection with the terminal, where the second cell is a new cell created by the mobile IAB node or an existing cell of the mobile IAB node, and the terminal is a terminal that provides services to a first cell; and
  configuring the mobile IAB node and the terminal to release the first cell.

According to a second aspect of the present disclosure, a cell reconfiguration method performed by a mobile IAB node is provided, which includes:
  receiving reconfiguration information of a first cell; and
  performing a cell reconfiguration operation according to the reconfiguration information, where the performing a cell reconfiguration operation includes:
  configuring a second cell as a secondary cell or a primary secondary cell of a terminal, and establishing a connection between the second cell and the terminal, where the second cell is a new cell created by the mobile IAB node or an existing cell of the mobile IAB node, and the terminal is a terminal that provides services to the first cell; and
  releasing the first cell.

According to a third aspect of the present disclosure, a network control node is provided, which includes:
  a configuration module, configured to perform a cell reconfiguration operation, where the performing a cell reconfiguration operation includes:
  configuring a mobile IAB node to configure a second cell as a secondary cell or a primary secondary cell of a terminal and to configure the second cell to establish a connection with the terminal, where the second cell is a new cell created by the mobile IAB node or an existing cell of the mobile IAB node, and the terminal is a terminal that provides services to a first cell; and
  configuring the mobile IAB node and the terminal to release the first cell.

According to a fourth aspect of the present disclosure, a mobile IAB node is provided, which includes:
  a receiving module, configured to receive reconfiguration information of a first cell; and
  an execution module, configured to perform a cell reconfiguration operation according to the reconfiguration information, where the performing a cell reconfiguration operation includes:
  configuring a second cell as a secondary cell or a primary secondary cell of a terminal, and establishing a connection between the second cell and the terminal, where the second cell is a new cell created by the mobile IAB node or an existing cell of the mobile IAB node, and the terminal is a terminal that provides services to the first cell; and
  releasing the first cell.

According to a fifth aspect of the present disclosure, a network control node is provided, which includes a processor, a memory, and a computer program stored in the memory and capable of being run on the processor, where the computer program is executed by the processor to implement the steps of the foregoing cell reconfiguration method applied to a network control node.

According to a sixth aspect of the present disclosure, a mobile IAB node is provided, which includes a processor, a memory, and a computer program stored in the memory and capable of being run on the processor, where the computer program is executed by the processor to implement the steps of the foregoing cell reconfiguration method applied to a mobile IAB node.

According to a seventh aspect of the present disclosure, a computer-readable storage medium is provided. The computer-readable storage medium stores a computer program, and the computer program implements the steps of the foregoing cell reconfiguration method applied to a network control node when being executed by a processor; or the computer program implements the steps of the foregoing cell reconfiguration method applied to a mobile IAB node when being executed by a processor.

In the embodiments of the present disclosure, during cell reconfiguration, a mobile IAB node is configured to configure a second cell as a secondary cell or a primary secondary cell of a terminal served by a first cell and to configure the second cell to establish a connection with the terminal, where the second cell is a new cell created by the mobile IAB node or an existing cell of the mobile IAB node. In a case that the first cell that needs to be reconfigured is a primary cell, the second cell may provide, in place of the first cell, services to the terminal served by the first cell, so that services of an active terminal in the first cell is not affected.

BRIEF DESCRIPTION OF THE DRAWINGS

Various other advantages and benefits become clear to a person of ordinary skill in the art by reading the following detailed description of exemplary implementations. The accompanying drawings are merely used for illustrating preferred implementations and are not intended to constitute a limitation on the present disclosure. Throughout the accompanying drawings, the same reference numerals are used to represent the same components. In the accompanying drawings:

FIG. 3 is a schematic structural diagram of CU-DU in an IAB system;

FIG. 4 is a schematic flowchart of a cell reconfiguration method according to Embodiment 1 of the present disclosure;

FIG. 5 is a schematic flowchart of a cell reconfiguration method according to Embodiment 2 of the present disclosure;

DETAILED DESCRIPTION

In addition, the terms "include" and any variant thereof in the description and claims of the present application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the description and claims represents at least one of connected objects. For example, A and/or B represents the following three cases: Only A exists, only B exists, and both A and B exist.

In addition, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the word "example" or "for example" or the like is intended to present a related concept in a specific manner.

The following describes the embodiments of the present disclosure with reference to the accompanying drawings. A cell reconfiguration method, a network control node, and a mobile IAB node provided in the embodiments of the present disclosure are applicable to an IAB system.

Figure 1:
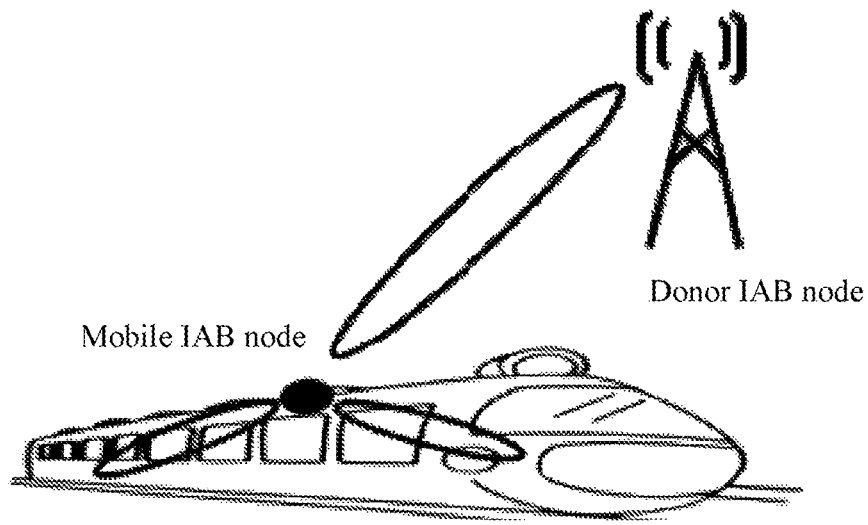
FIG. 1 is an example diagram of a mobile IAB node providing a wireless relay service to train passengers.
Figure 2:
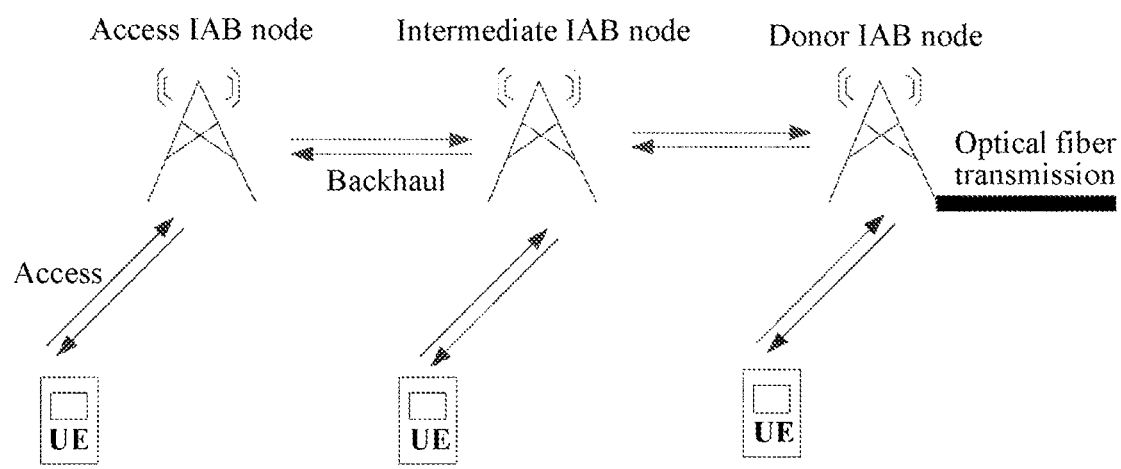
FIG. 2 is a schematic architectural diagram of an IAB system according to an embodiment of the present disclosure.

FIG. 2 is a schematic architectural diagram of an IAB system according to an embodiment of the present disclosure. FIG. 3 is a schematic structural diagram of CU-DU in an IAB system. The IAB system may include a plurality of IAB nodes. Every IAB node other than a donor IAB node (Donor IAB node) includes a distributed unit (Distributed Unit, DU) function part and a mobile termination (Mobile Termination, MT) function part. Depending on the MT, one IAB node may find one parent IAB node (parent IAB node), and establish a wireless connection with a DU of the parent IAB node. The wireless connection is referred to as a backhaul link (backhaul link). After a complete backhaul link has been established for one IAB node, the IAB node turns on the function of a DU of the IAB node. The DU provides a cell service. That is, the DU may provide an access service to the UE. One self-backhaul circuit includes one donor IAB node. The donor IAB node is directly connected to a wired transmission network (optical fiber transmission (Cable transport)).

Referring to FIG. 3, in a self-backhaul circuit, DUs of all IAB nodes are all connected to one centralized unit (CU) node. The CU node configures the DUs by using the F1-AP protocol. The CU configures the MT by using the RRC protocol. The donor IAB node does not have an MT function part.

The IAB system is introduced to resolve inadequate deployment of a wired transmission network during dense deployment of access points. That is, when there is no wired transmission network, the access points may depend on wired backhaul.

The mobile IAB node is a mobile self-backhaul relay base station that can be installed on a transportation vehicle (such as a train, a bus, or a ship) to provide passengers with instant messaging demands. While bringing convenience to communication, the mobile IAB node also incurs problems that are absent in some fixed IAB systems. When a mobile cell provided by the mobile IAB node is turned on, the mobile cell uses a physical cell identifier (Physical Cell Identifier, PCI) different from those of surrounding cells. However, during the movement of the mobile IAB node, the surrounding cells change as the position of the mobile IAB node changes. In a case that a PCI of a surrounding cell is the same as a PCI of a mobile cell provided by the mobile IAB node, a PCI conflict occurs between the mobile cell and the neighboring cell. Therefore, a cell needs to be reconfigured.

Certainly, apart from a PCI conflict, there may be other cases in which a cell needs to be reconfigured. How to reconfigure a cell without affecting services of active terminals in a cell is a problem that needs to be solved.

To resolve the foregoing problem, FIG. 4 is a schematic flowchart of a cell reconfiguration method according to Embodiment 1 of the present disclosure. The method is applied to a network control node, and includes the following steps.

Step 41: Perform a cell reconfiguration operation, where the performing a cell reconfiguration operation includes:

configuring a mobile IAB node to configure a second cell as a secondary cell (Scell) or a primary secondary cell (PSCell) of a terminal and to configure the second cell to establish a connection with the terminal, where the second cell is a new cell created by the mobile IAB node or an existing cell of the mobile IAB node, and the terminal is a terminal that provides services to a first cell; and configuring the mobile IAB node and the terminal to release the first cell.

In the embodiments of the present disclosure, the mobile IAB node is configured to configure the second cell as a secondary cell or a primary secondary cell of a terminal served by the first cell and to configure the second cell to establish a connection with the terminal, where the second cell is a new cell created by the mobile IAB node or an existing cell of the mobile IAB node, so that a cell is reconfigured without affecting services of active terminals in the first cell.

Terminals in the embodiments of the present disclosure are all active terminals.

In some embodiments of the present disclosure, optionally, the performing a cell reconfiguration operation includes: in a case that a PCI conflict occurs between the first cell provided by the mobile IAB node and a surrounding cell or there is a potential PCI conflict, performing the cell reconfiguration operation.

In the embodiments of the present disclosure, in a case that a PCI conflict occurs between the first cell provided by the mobile IAB node and a surrounding cell or there is a potential PCI conflict, the mobile IAB node is configured to configure the second cell as a secondary cell or a primary secondary cell of a terminal served by the first cell and to configure the second cell to establish a connection with the terminal, where the second cell is a new cell created by the mobile IAB node or an existing cell of the mobile IAB node, so that it can be ensured that services of the terminal served by the first cell are normally performed.

In the embodiments of the present disclosure, the second cell may be configured as a secondary cell (SCell) of the terminal by using carrier aggregation technology, or a connection is established between the second cell and the terminal by using dual connectivity technology (Dual connectivity), so that the second cell is referred to as a primary secondary cell (PSCell) of the terminal.

In the embodiments of the present disclosure, optionally, before the performing a cell reconfiguration operation, the method further includes: in a case that a PCI conflict report that is transmitted by the mobile IAB node or the terminal and is about the first cell is received, determining that a PCI conflict occurs between the first cell and a surrounding cell. That is, when receiving the PCI conflict report transmitted by the mobile IAB node or the terminal, the network control node may determine that a PCI conflict occurs between the first cell and a surrounding cell, and therefore a cell reconfiguration operation needs to be performed.

In some embodiments of the present disclosure, optionally, before the performing a cell reconfiguration operation, the method further includes: in a case that it is detected that a PCI of the first cell is the same as a PCI of a surrounding cell, determining that a PCI conflict occurs between the first cell and the surrounding cell. That is, the network control node may monitor whether the PCI of the first cell of the mobile IAB node is the same as a PCI of a surrounding cell. In a case that it is detected that the PCIs are the same, it may be determined that a PCI conflict occurs between the first cell and the surrounding cell, and therefore a cell reconfiguration operation needs to be performed.

In some embodiments of the present disclosure, optionally, before the performing a cell reconfiguration operation, the method further includes: in a case that it is predicted that within a future specified time period, a PCI of the first cell is the same as a PCI of a cell in an area at which the mobile IAB node is about to arrive, determining that there is a potential PCI conflict in the first cell. The network control node in the embodiments of the present disclosure may be an Operations, Administration and Maintenance (Operation Administration and Maintenance, OAM) node connected to a CU. The network control node may predict, according to a movement direction, a movement speed, and the like of the mobile IAB node, an area at which the mobile IAB node is about to arrive, determine whether a cell with a PCI the same as the PCI of the first cell exists in the area at which the mobile IAB node is about to arrive, and if yes, determine that there is a potential PCI conflict in the first cell, and therefore a cell reconfiguration operation needs to be performed.

In some embodiments of the present disclosure, optionally, before the performing a cell reconfiguration operation, the method further includes: in a case that it is detected that a PCI of the first cell is the same as a PCI of a cell within a specified distance from the mobile IAB node, determining that there is a potential PCI conflict in the first cell. The network control node in the embodiments of the present disclosure may be an OAM node connected to a CU. the network control node may determine whether a PCI of a cell within a specified distance from the mobile IAB node is the same as the PCI of the first cell, and if yes, determine that there is a potential PCI conflict in the first cell, and therefore a cell reconfiguration operation needs to be performed. The specified distance is, for example, 1000 meters.

In the embodiments of the present disclosure, in a case that the second cell is a new cell created by the mobile IAB node, the configuring a mobile IAB node to configure a second cell as a secondary cell or a primary secondary cell of a terminal includes:

selecting a PCI that does not conflict with a PCI of the first cell; and configuring the mobile IAB node to use the non-conflicting PCI to create a new cell as the second cell.

In the embodiments of the present disclosure, the foregoing network control node may control a CU node of the mobile IAB node or may be an OAM node connected to a CU node.

In some embodiments of the present disclosure, in a case that the network control node is a CU node, a CU may receive a PCI conflict report that is transmitted by the mobile IAB node or the terminal and is about the first cell, and select, according to collected information of surrounding cells, one PCI that does not conflict with the PCI of the first cell. Next, the mobile IAB node is configured to use the non-conflicting PCI to create a new cell as the second cell.

In some embodiments of the present disclosure, in a case that the network control node is an OAM node, the CU node may monitor whether the PCI of the first cell is the same as a PCI of a surrounding cell, and in a case that it is detected that the PCI of the first cell is the same as a PCI of a surrounding cell, transmit a PCI conflict report to the OAM node, and the OAM node selects one PCI that does not conflict with the PCI of the first cell. Next, the mobile IAB node is configured to use the non-conflicting PCI to create a new cell as the second cell.

In some embodiments of the present disclosure, in a case that the network control node is an OAM node, after the OAM node is registered, the mobile IAB node may report PCI information of cells to the OAM node, and the OAM node may predict, within a future specified time period, whether the PCI of the first cell is the same as a PCI of a cell in an area at which the mobile IAB node is about to arrive, and if yes, determine that there is a potential PCI conflict. The OAM node may actively configure a non-conflicting PCI for the mobile IAB node and configure the mobile IAB node to use the non-conflicting PCI to create a new cell as the second cell, to avoid in advance a PCI conflict.

In the embodiments of the present disclosure, the first cell may be a primary cell (Pcell) or may be a secondary cell. When the first cell is a cell of a different type (a primary cell or a secondary cell), the cell reconfiguration method is also different. Details are described below.

In some embodiments of the present disclosure, referring to FIG. 5, optionally, in a case that the first cell is a primary cell, the performing a cell reconfiguration operation includes:

Step 51: Configure the mobile IAB node to configure the second cell as a secondary cell or a primary secondary cell of the terminal and to configure the second cell to establish a connection with the terminal, where the second cell is a campable new cell created by the mobile IAB node, and the mobile IAB node reconfigures an existing non-campable cell as a campable new cell, or the mobile IAB node already has a campable cell.

Step 52: Configure the mobile IAB node to configure the second cell as a new primary cell.

Step 53: Configure the mobile IAB node and the terminal to release the first cell.

Optionally, the configuring a mobile IAB node to configure a second cell as a secondary cell or a primary secondary cell of a terminal includes: configuring the mobile IAB node to create a new cell as the second cell on a carrier of the first cell, and configuring the second cell as a secondary cell or a primary secondary cell of the terminal.

Optionally, the configuring the mobile IAB node to create a new cell as the second cell on a carrier includes: configuring the mobile IAB node to transmit discovery reference signals (Discovery Reference Signal, DRS) of the second cell and the first cell on the carrier in a frequency division multiplexing manner. The discovery reference signals include, but not limited to, primary synchronization signals (PSS), secondary synchronization signals (SSS), physical broadcast channels (Physical broadcast channel, PBCH), system information blocks (System Information Block, SIBs), or the like.

Figure 6:
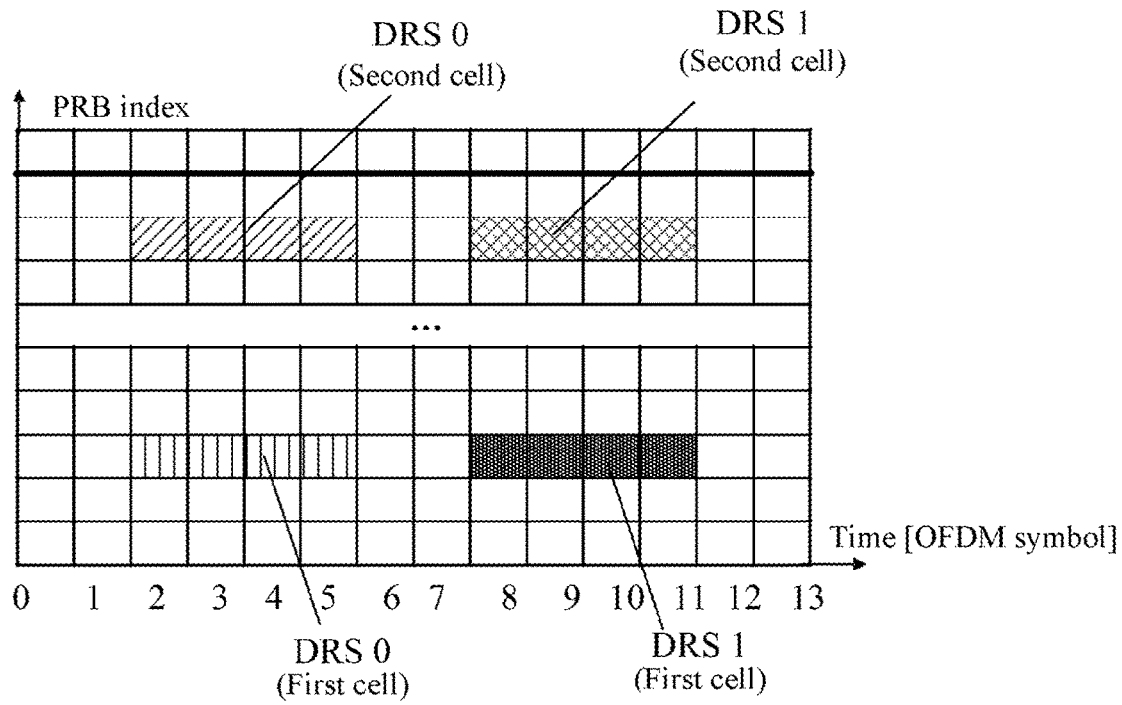
FIG. 6 is a schematic diagram of a method for transmitting discovery reference signals (DRS) of a second cell and a first cell in a frequency division multiplexing manner according to an embodiment of the present disclosure.

FIG. 6 is a schematic diagram of a method for transmitting discovery reference signals (DRS) of a second cell and a first cell in a frequency division multiplexing manner according to an embodiment of the present disclosure. FIG. 6 shows time-frequency domain resources in which the discovery reference signals are located. The horizontal coordinate of the time-frequency domain resources is time, and the unit is an orthogonal frequency division multiplexing (Orthogonal Frequency Division Multiplexing, OFDM) symbol. The vertical coordinate is frequency domain, and the unit is an index (index) of a physical resource block (Physical Resource Block, PRB).

In the foregoing embodiments, the mobile IAB node may support only one carrier or may support at least two carriers.

In some embodiments of the present disclosure, optionally, the configuring a mobile IAB node to configure a second cell as a secondary cell or a primary secondary cell of a terminal includes: in a case that the mobile IAB node supports at least two carriers and there is no inter-frequency cell, configuring the mobile IAB node to create a new cell as the second cell on an inter-frequency, and configuring the second cell as a secondary cell or a primary secondary cell of the terminal.

In some embodiments of the present disclosure, optionally, the configuring a mobile IAB node to configure a second cell as a secondary cell or a primary secondary cell of a terminal includes: in a case that the mobile IAB node supports at least two carriers and there is an inter-frequency cell but the inter-frequency cell is a non-campable cell, configuring the mobile IAB node to reconfigure the inter-frequency cell as a campable cell for use as the second cell, and configuring the second cell as a secondary cell or a primary secondary cell of the terminal.

The non-campable cell means that a configuration of the inter-frequency cell limits that the cell can only be used as an SCell but cannot be used as a PCell. For example, in the cell, only a PSS, an SSS, and/or a PBCH signal is propagated, but SIB1 and other broadcast information are not propagated. The inter-frequency cell is reconfigured as a campable cell. For example, it may be configured that the inter-frequency cell transmits the remaining broadcast information. For example, in addition to a PSS, an SSS, and a PBCH signal, SIB1 and other broadcast information are further broadcast, so that the inter-frequency cell can become a camping cell or be used as a PCell.

In some embodiments of the present disclosure, optionally, the configuring a mobile IAB node to configure a second cell as a secondary cell or a primary secondary cell of a terminal includes: in a case that the mobile IAB node supports at least two carriers and there is a campable inter-frequency cell, configuring the mobile IAB node to use the inter-frequency cell as the second cell to configure the second cell as a secondary cell or a primary secondary cell of the terminal.

Figure 7:
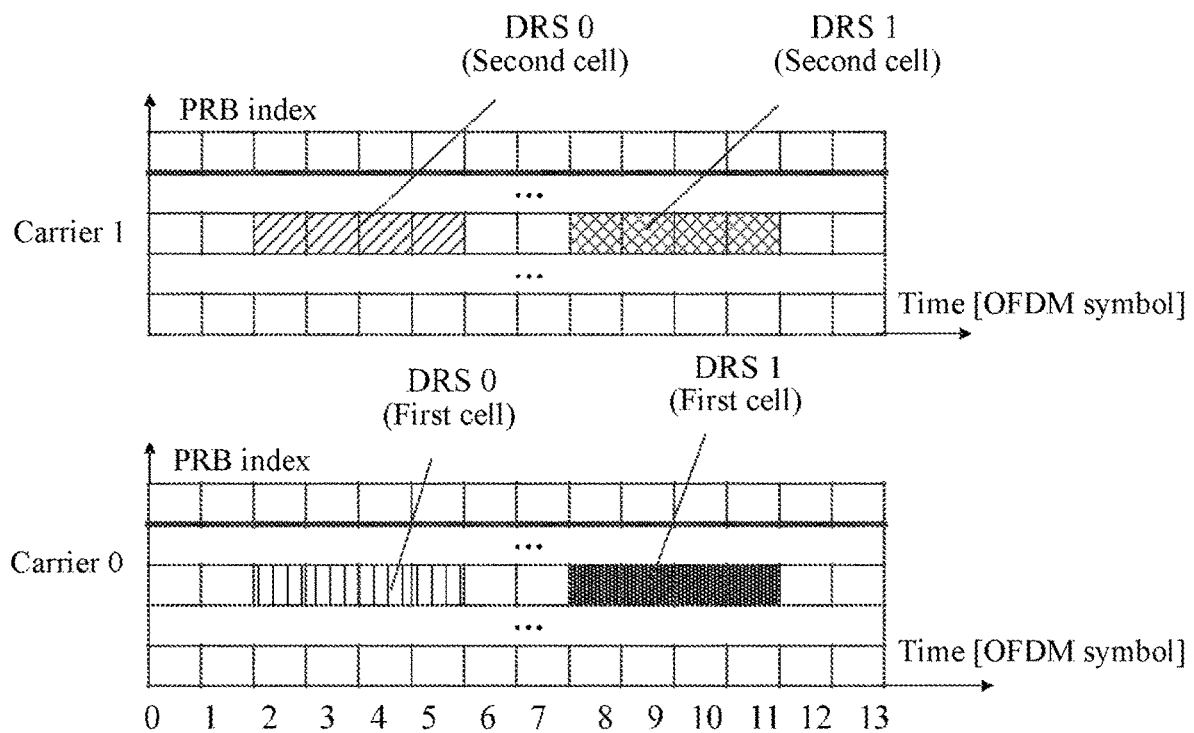
FIG. 7 is a schematic diagram of a method for transmitting discovery reference signals (DRS) of a second cell and a first cell when an inter-frequency cell is used as the second cell according to an embodiment of the present disclosure.

FIG. 7 is a schematic diagram of a method for transmitting discovery reference signals (DRS) of a second cell and a first cell when an inter-frequency cell is used as the second cell according to an embodiment of the present disclosure. FIG. 7 shows time-frequency domain resources in which the discovery reference signals are located. The horizontal coordinate of the time-frequency domain resources is time, and the unit is an OFDM symbol. The vertical coordinate is frequency domain, and the unit is an index of a PRB. In FIG. 7, the DRS is transmitted on a carrier 0 in the first cell, and the DRS is transmitted on a carrier 1 in the second cell.

Figure 8:
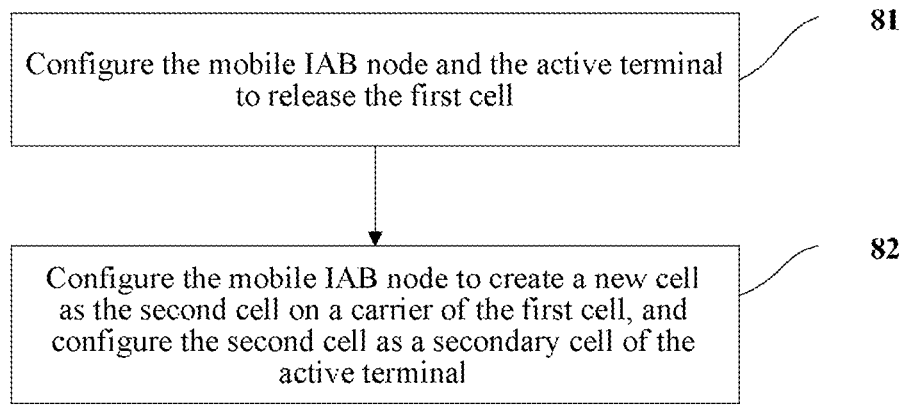
FIG. 8 is a schematic flowchart of a cell reconfiguration method according to Embodiment 3 of the present disclosure.

In some embodiments of the present disclosure, referring to FIG. 8, optionally, in a case that the first cell is a secondary cell, the performing a cell reconfiguration operation includes:

Step 81: Configure the mobile IAB node and the terminal to release the first cell.

Step 82: Configure the mobile IAB node to create a new cell as the second cell on a carrier of the first cell, and configure the second cell as a secondary cell of the terminal.

In the embodiments of the present disclosure, when the first cell is a secondary cell, because the secondary cell does not provide services, the first cell may be first released, and then a new cell is created in the first cell and is configured as a secondary cell of the terminal.

Optionally, after the configuring the second cell as a secondary cell of the terminal in the first cell, the method further includes: configuring the mobile IAB node to activate the second cell.

In the foregoing embodiments, optionally, the configuring the mobile IAB node and the terminal to release the first cell includes:

configuring the mobile IAB node to stop transmitting a discovery reference signal (Discovery Reference Signal, DRS) of the first cell; and configuring the terminal to release a connection with the first cell.

In the embodiments of the present disclosure, the terminal may be configured by using existing radio resource control (Radio Resource Control, RRC) signaling to release the first cell.

Figure 9:
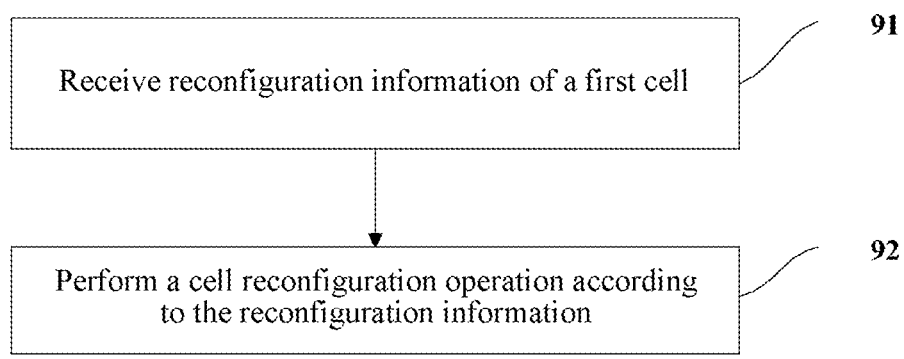
FIG. 9 is a schematic flowchart of a cell reconfiguration method according to Embodiment 4 of the present disclosure.

Referring to FIG. 9, the embodiments of the present disclosure further provide a cell reconfiguration method, applied to a mobile IAB node, and including the following steps.

Step 91: Receive reconfiguration information of a first cell.

Step 92: Perform a cell reconfiguration operation according to the reconfiguration information, where the performing a cell reconfiguration operation includes:

configuring a second cell as a secondary cell or a primary secondary cell of a terminal, and establishing a connection between the second cell and the terminal, where the second cell is a new cell created by the mobile IAB node or an existing cell of the mobile IAB node, and the terminal is a terminal that provides services to the first cell; and releasing the first cell.

In the embodiments of the present disclosure, the mobile IAB node configures, according to reconfiguration information transmitted by a network control node, the second cell as a secondary cell or a primary secondary cell of a terminal served by the first cell and to configure the second cell to establish a connection with the terminal, where the second cell is a new cell created by the mobile IAB node or an existing cell of the mobile IAB node, so that it can be ensured that services of the terminal served by the first cell are not interrupted during cell reconfiguration.

In the embodiments of the present disclosure, optionally, before the receiving reconfiguration information of a first cell, the method further includes: in a case that it is detected that a PCI of the first cell is the same as a PCI of a surrounding cell, transmitting a PCI conflict report.

In the embodiments of the present disclosure, optionally, in a case that the first cell is a primary cell, the performing a cell reconfiguration operation includes:

configuring the second cell as a secondary cell or a primary secondary cell of the terminal and to configure the second cell to establish a connection with the terminal, where the second cell is a campable new cell created by the mobile IAB node, and the mobile IAB node reconfigures an existing non-campable cell as a campable new cell, or the mobile IAB node already has a campable cell;

configuring the second cell as a new primary cell; and releasing the first cell.

In the embodiments of the present disclosure, optionally, the configuring a second cell as a secondary cell or a primary secondary cell of a terminal includes:

creating a new cell as the second cell on a carrier of the first cell, and configuring the second cell as a secondary cell or a primary secondary cell of the terminal.

In the embodiments of the present disclosure, optionally, the creating a new cell as the second cell on a carrier of the first cell includes:

transmitting discovery reference signals of the second cell and the first cell on the carrier in a frequency division multiplexing manner.

In the embodiments of the present disclosure, optionally, the configuring a second cell as a secondary cell or a primary secondary cell of a terminal includes: in a case that the mobile IAB node supports at least two carriers and there is no inter-frequency cell, creating a new cell as the second cell on an inter-frequency, and configuring the second cell as a secondary cell or a primary secondary cell of the terminal.

In the embodiments of the present disclosure, optionally, the configuring a second cell as a secondary cell or a primary secondary cell of a terminal includes: in a case that the mobile IAB node supports at least two carriers and there is an inter-frequency cell but the inter-frequency cell is a non-campable cell, reconfiguring the inter-frequency cell as a campable cell for use as the second cell, and configuring the second cell as a secondary cell or a primary secondary cell of the terminal.

In the embodiments of the present disclosure, optionally, the configuring a second cell as a secondary cell or a primary secondary cell of a terminal includes: in a case that the mobile IAB node supports at least two carriers and there is a campable inter-frequency cell, using the inter-frequency cell as the second cell to configure the second cell as a secondary cell or a primary secondary cell of the terminal.

In the embodiments of the present disclosure, optionally, in a case that the first cell is a secondary cell, the performing a cell reconfiguration operation includes:

releasing the first cell; and creating a new cell as the second cell on a carrier of the first cell, and configuring the second cell as a secondary cell of the terminal.

In the embodiments of the present disclosure, optionally, after the configuring the second cell as a secondary cell of the terminal in the first cell, the method further includes:

activating the second cell.

In the embodiments of the present disclosure, optionally, the releasing the first cell includes:

stopping transmitting the discovery reference signal of the first cell.

In the embodiments of the present disclosure, optionally, the releasing the first cell further includes: using a non-conflicting PCI to create a new cell on the carrier of the first cell, to provide services.

Figure 10:
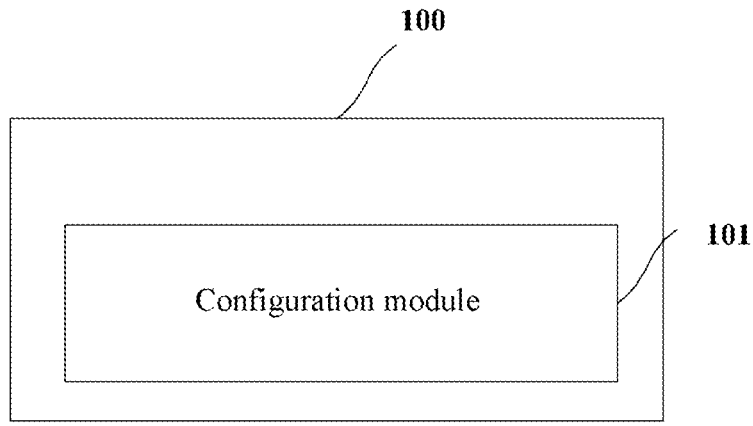
FIG. 10 is a schematic structural diagram of a network control node according to Embodiment 5 of the present disclosure.

Referring to FIG. 10, the present disclosure further provides a network control node 100, including:

a configuration module 101, configured to perform a cell reconfiguration operation, where the performing a cell reconfiguration operation includes:

configuring a mobile IAB node to configure a second cell as a secondary cell or a primary secondary cell of a terminal and to configure the second cell to establish a connection with the terminal, where the second cell is a new cell created by the mobile IAB node or an existing cell of the mobile IAB node, and the terminal is a terminal that provides services to a first cell; and
configuring the mobile IAB node and the terminal to release the first cell.

In the embodiments of the present disclosure, optionally, the configuration module 101 is configured to: in a case that a PCI conflict occurs between the first cell provided by the mobile self-backhaul IAB node and a surrounding cell or there is a potential PCI conflict, perform the cell reconfiguration operation.

In the embodiments of the present disclosure, optionally, the network control node further includes:
a first determining module, configured to: in a case that a PCI conflict report that is transmitted by the mobile IAB node or the terminal and is about the first cell is received, determine that a PCI conflict occurs between the first cell and a surrounding cell; or
a second determining module, configured to: in a case that it is detected that a PCI of the first cell is the same as a PCI of a surrounding cell, determine that a PCI conflict occurs between the first cell and the surrounding cell; or
a third determining module, configured to: in a case that it is predicted that within a future specified time period, a PCI of the first cell is the same as a PCI of a cell in an area at which the mobile IAB node is about to arrive, determine that there is a potential PCI conflict in the first cell; or
a fourth determining module, configured to: in a case that it is detected that a PCI of the first cell is the same as a PCI of a cell within a specified distance from the mobile IAB node, determine that there is a potential PCI conflict in the first cell.

In the embodiments of the present disclosure, optionally, in a case that the second cell is a new cell created by the mobile IAB node, the configuration module 101 is configured to: select a PCI that does not conflict with a PCI of the first cell; and configure the mobile IAB node to use the non-conflicting PCI to create a new cell as the second cell.

In the embodiments of the present disclosure, optionally, in a case that the first cell is a primary cell, the configuration module 101 is configured to: configure the mobile IAB node to configure the second cell as a secondary cell or a primary secondary cell of the terminal and to configure the second cell to establish a connection with the terminal, where the second cell is a campable new cell created by the mobile IAB node, and the mobile IAB node reconfigures an existing non-campable cell as a campable new cell, or the mobile IAB node already has a campable cell; configure the mobile IAB node to configure the second cell as a new primary cell; and configure the mobile IAB node and the terminal to release the first cell.

In the embodiments of the present disclosure, optionally, the configuration module 101 is configured to: configure the mobile IAB node to create a new cell as the second cell on a carrier of the first cell, and configure the second cell as a secondary cell or a primary secondary cell of the terminal.

In the embodiments of the present disclosure, optionally, the configuration module is configured to configure the mobile IAB node to transmit discovery reference signals of the second cell and the first cell on the carrier in a frequency division multiplexing manner.

In the embodiments of the present disclosure, optionally, the configuration module 101 is configured to: in a case that the mobile IAB node supports at least two carriers and there is no inter-frequency cell, configure the mobile IAB node to create a new cell as the second cell on an inter-frequency, and configure the second cell as a secondary cell or a primary secondary cell of the terminal.

In the embodiments of the present disclosure, optionally, the configuration module 101 is configured to: in a case that the mobile IAB node supports at least two carriers and there is an inter-frequency cell but the inter-frequency cell is a non-campable cell, configure the mobile IAB node to reconfigure the inter-frequency cell as a campable cell for use as the second cell, and configure the second cell as a secondary cell or a primary secondary cell of the terminal.

In the embodiments of the present disclosure, optionally, the configuration module 101 is configured to: in a case that the mobile IAB node supports at least two carriers and there is a campable inter-frequency cell, configure the mobile IAB node to use the inter-frequency cell as the second cell to configure the second cell as a secondary cell or a primary secondary cell of the terminal.

In the embodiments of the present disclosure, optionally, in a case that the first cell is a secondary cell, the configuration module 101 is configured to: configure the mobile IAB node and the terminal to release the first cell; and configure the mobile IAB node to create a new cell as the second cell on a carrier of the first cell, and configure the second cell as a secondary cell of the terminal.

In the embodiments of the present disclosure, optionally, the configuration module 101 is configured to: configure the mobile IAB node to activate the second cell.

In the embodiments of the present disclosure, optionally, the configuration module 101 is configured to: configure the mobile IAB node to stop transmitting a discovery reference signal of the first cell; and configure the terminal to release a connection with the first cell.

The network control node provided in the embodiments of the present disclosure can implement various processes implemented by the network control node in the method embodiments of FIG. 4 to FIG. 8. To avoid repetition, details are not described herein again.

Figure 11:
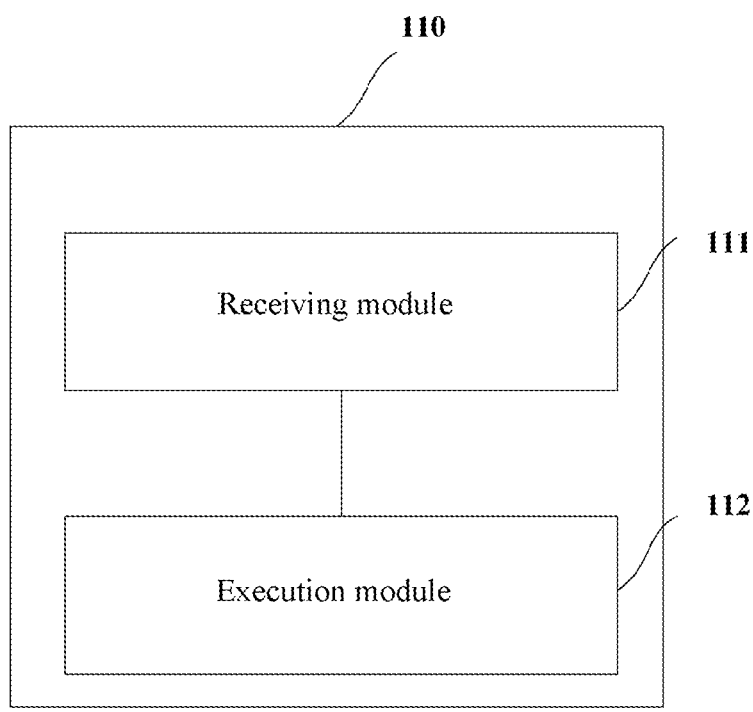
FIG. 11 is a schematic structural diagram of a mobile IAB node according to Embodiment 6 of the present disclosure.

Referring to FIG. 11, the embodiments of the present disclosure further provide a mobile IAB node 110, including:
a receiving module 111, configured to receive reconfiguration information of a first cell; and
an execution module 112, configured to perform a cell reconfiguration operation according to the reconfiguration information, where the performing a cell reconfiguration operation includes:
configuring a second cell as a secondary cell or a primary secondary cell of a terminal, and establishing a connection between the second cell and the terminal, where the second cell is a new cell created by the mobile IAB node or an existing cell of the mobile IAB node, and the terminal is a terminal that provides services to the first cell; and
releasing the first cell.

In the embodiments of the present disclosure, optionally, the mobile IAB node further includes:
a transmission module, configured to: in a case that it is detected that a PCI of the first cell is the same as a PCI of a surrounding cell, transmit a PCI conflict report.

In the embodiments of the present disclosure, optionally, in a case that the first cell is a primary cell, the execution module is configured to: configure the second cell as a secondary cell or a primary secondary cell of the terminal and to configure the second cell to establish a connection with the terminal, where the second cell is a campable new cell created by the mobile IAB node, and the mobile IAB node reconfigures an existing non-campable cell as a campable new cell, or the mobile IAB node already has a campable cell; configure the second cell as a new primary cell; and release the first cell.

In the embodiments of the present disclosure, optionally, the execution module is configured to: create a new cell as the second cell on a carrier of the first cell, and configure the second cell as a secondary cell or a primary secondary cell of the terminal.

In the embodiments of the present disclosure, optionally, the execution module is configured to: transmit discovery reference signals of the second cell and the first cell on the carrier in a frequency division multiplexing manner.

In the embodiments of the present disclosure, optionally, the execution module is configured to: in a case that the mobile IAB node supports at least two carriers and there is no inter-frequency cell, create a new cell as the second cell on an inter-frequency, and configure the second cell as a secondary cell or a primary secondary cell of the terminal.

In the embodiments of the present disclosure, optionally, the execution module is configured to: in a case that the mobile IAB node supports at least two carriers and there is an inter-frequency cell but the inter-frequency cell is a non-campable cell, reconfigure the inter-frequency cell as a campable cell for use as the second cell, and configure the second cell as a secondary cell or a primary secondary cell of the terminal.

In the embodiments of the present disclosure, optionally, the execution module is configured to: in a case that the mobile IAB node supports at least two carriers and there is a campable inter-frequency cell, use the inter-frequency cell as the second cell to configure the second cell as a secondary cell or a primary secondary cell of the terminal.

In the embodiments of the present disclosure, optionally, in a case that the first cell is a secondary cell, the execution module is configured to: release the first cell; and create a new cell as the second cell on a carrier of the first cell, and configure the second cell as a secondary cell of the terminal.

In the embodiments of the present disclosure, optionally, the execution module is configured to: activate the second cell.

In the embodiments of the present disclosure, optionally, the execution module is configured to: stop transmitting the discovery reference signal of the first cell.

The mobile IAB node provided in the embodiments of the present disclosure can implement various processes implemented by the mobile IAB node in the method embodiment of FIG. 9. To avoid repetition, details are not described herein again.

Figure 12:
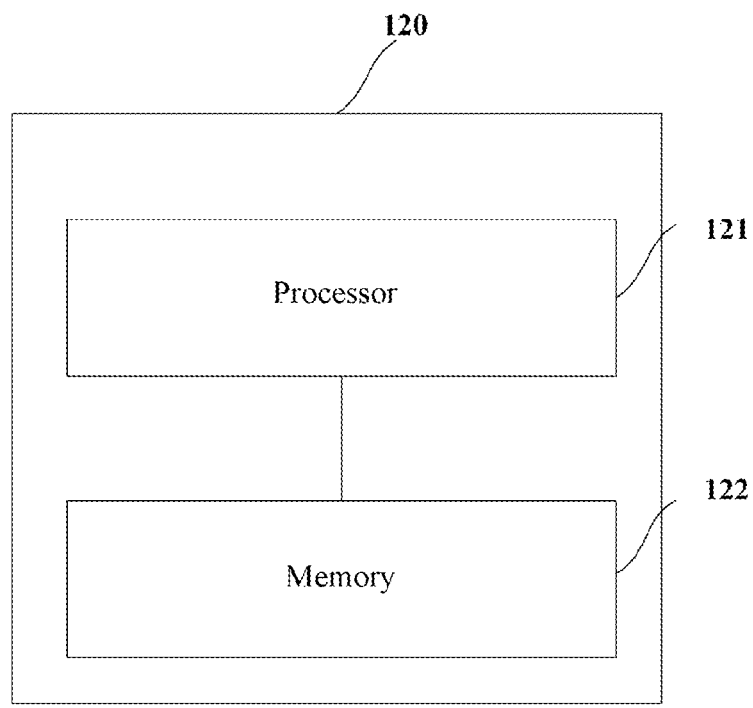
FIG. 12 is a schematic structural diagram of a network control node according to Embodiment 7 of the present disclosure.

Referring to FIG. 12, the embodiments of the present disclosure further provide a network control node 120, including the processor 121 and the memory 122 and a computer program stored in the memory 122 and capable of being run on the processor 121, where the computer program implements various processes of the embodiments of the foregoing cell reconfiguration method applied to a network control node when being executed by the processor 121, and can achieve the same technical effects. To avoid repetition, details are not described herein again.

Figure 13:
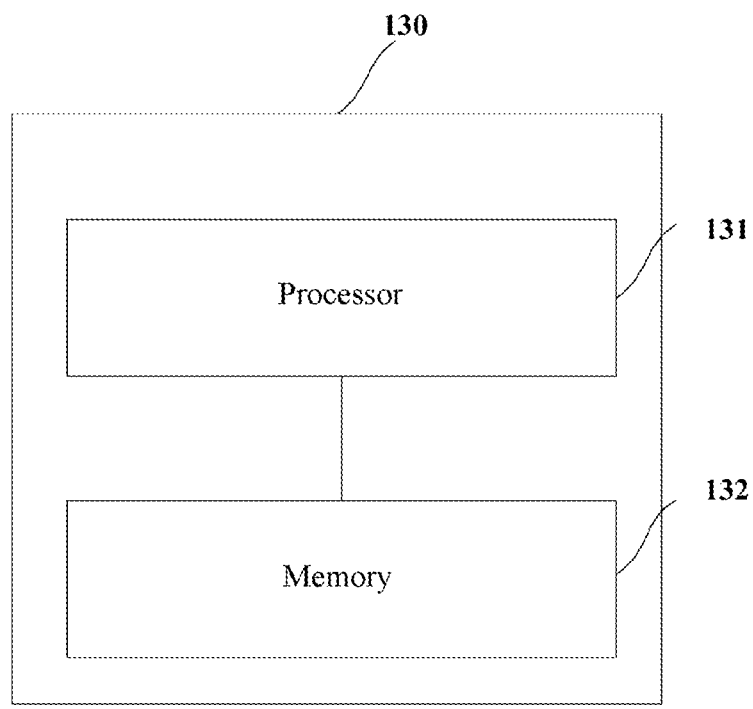
FIG. 13 is a schematic structural diagram of a mobile IAB node according to Embodiment 8 of the present disclosure.

Referring to FIG. 13, the embodiments of the present disclosure further provide a mobile IAB node 130, including the processor 131 and the memory 132 and a computer program stored in the memory 132 and capable of being run on the processor 131, where the computer program implements various processes of the embodiments of the foregoing cell reconfiguration method applied to a mobile IAB node when being executed by the processor 131, and can achieve the same technical effects. To avoid repetition, details are not described herein again.

The embodiments of the present disclosure further provide a computer-readable storage medium, storing a computer program, where the computer program, when executed by a processor, implements various processes of the embodiments of the cell reconfiguration method applied to a network control node, or the computer program, when executed by a processor, implements various processes of the embodiments of the foregoing cell reconfiguration method applied to a mobile IAB node, and can achieve the same technical effects. To avoid repetition, details are not described herein again. The computer-readable storage medium is, for example, a read-only memory (Read-Only Memory, ROM), a random access memory (Random Access Memory, RAM), a magnetic disk, an optical disc, or the like.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of the present disclosure.

The embodiments of the present disclosure have been described above with reference to the accompanying drawings. The present disclosure is not limited to the specific embodiments described above, and the specific embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A cell reconfiguration method performed by a mobile integrated access backhaul (IAB) node, comprising:
   receiving reconfiguration information of a first cell; and
   performing a cell reconfiguration operation according to the reconfiguration information, wherein the performing a cell reconfiguration operation comprises:
   configuring a second cell as a secondary cell or a primary secondary cell of a terminal, and establishing a connection between the second cell and the terminal, wherein the second cell is a new cell created by the mobile IAB node, and the terminal is a terminal that provides services to the first cell; and
   releasing the first cell;

wherein in a case that the first cell is a secondary cell, the performing a cell reconfiguration operation comprises:
releasing the first cell; and
creating a new cell as the second cell on a carrier of the first cell, and configuring the second cell as a secondary cell of the terminal;
activating the second cell.

2. The method according to claim 1, wherein before the receiving reconfiguration information of a first cell, the method further comprises:
in a case that it is detected that a physical cell identifier (PCI) of the first cell is the same as a PCI of a surrounding cell, transmitting a PCI conflict report.

3. The method according to claim 1, wherein in a case that the first cell is a primary cell, the performing a cell reconfiguration operation comprises:
configuring the second cell as a secondary cell or a primary secondary cell of the terminal and to configure the second cell to establish a connection with the terminal, wherein the second cell is a campable new cell created by the mobile IAB node;
configuring the second cell as a new primary cell; and
releasing the first cell.

4. The method according to claim 3, wherein the configuring a second cell as a secondary cell or a primary secondary cell of a terminal comprises:
creating a new cell as the second cell on a carrier of the first cell, and configuring the second cell as a secondary cell or a primary secondary cell of the terminal;
wherein the creating a new cell as the second cell on a carrier of the first cell comprises:
transmitting discovery reference signals of the second cell and the first cell on the carrier in a frequency division multiplexing manner.

5. The method according to claim 3, wherein the configuring a second cell as a secondary cell or a primary secondary cell of a terminal comprises:
in a case that the mobile IAB node supports at least two carriers and there is no inter-frequency cell, creating a new cell as the second cell on an inter-frequency, and configuring the second cell as a secondary cell or a primary secondary cell of the terminal; or
in a case that the mobile IAB node supports at least two carriers and there is an inter-frequency cell but the inter-frequency cell is a non-campable cell, reconfiguring the inter-frequency cell as a campable cell for use as the second cell, and configuring the second cell as a secondary cell or a primary secondary cell of the terminal; or
in a case that the mobile IAB node supports at least two carriers and there is a campable inter-frequency cell, using the inter-frequency cell as the second cell to configure the second cell as a secondary cell or a primary secondary cell of the terminal.

6. The method according to claim 1, wherein the releasing the first cell comprises:
stopping transmitting the discovery reference signal of the first cell.

7. A cell reconfiguration method performed by a network control node, comprising:
configuring a mobile integrated access backhaul (IAB) node to perform the method of claim 1; and
configuring the terminal to release the first cell.

8. The method according to claim 7, wherein the performing a cell reconfiguration operation comprises:

in a case that a physical cell identifier (PCI) conflict occurs between the first cell and a surrounding cell or there is a potential PCI conflict, performing the cell reconfiguration operation.

9. The method according to claim 8, wherein before the performing a cell reconfiguration operation, the method further comprises:
in a case that a PCI conflict report that is transmitted by the mobile IAB node or the terminal and is about the first cell is received, determining that a PCI conflict occurs between the first cell and a surrounding cell; or
in a case that it is detected that a PCI of the first cell is the same as a PCI of a surrounding cell, determining that a PCI conflict occurs between the first cell and the surrounding cell; or
in a case that it is predicted that within a future specified time period, a PCI of the first cell is the same as a PCI of a cell in an area at which the mobile IAB node is about to arrive, determining that there is a potential PCI conflict in the first cell; or
in a case that it is detected that a PCI of the first cell is the same as a PCI of a cell within a specified distance from the mobile IAB node, determining that there is a potential PCI conflict in the first cell.

10. The method according to claim 8, wherein in a case that the second cell is a new cell created by the mobile IAB node, the configuring a mobile IAB node to configure a second cell as a secondary cell or a primary secondary cell of a terminal comprises:
selecting a PCI that does not conflict with a PCI of the first cell; and
configuring the mobile IAB node to use the non-conflicting PCI to create a new cell as the second cell.

11. The method according to claim 7, wherein in a case that the first cell is a primary cell, the performing a cell reconfiguration operation comprises:
configuring the mobile IAB node to configure the second cell as a secondary cell or a primary secondary cell of the terminal and to configure the second cell to establish a connection with the terminal, wherein the second cell is a campable new cell created by the mobile IAB node;
configuring the mobile IAB node to configure the second cell as a new primary cell; and
configuring the mobile IAB node and the terminal to release the first cell.

12. The method according to claim 11, wherein the configuring a mobile IAB node to configure a second cell as a secondary cell or a primary secondary cell of a terminal comprises:
configuring the mobile IAB node to create a new cell as the second cell on a carrier of the first cell, and configuring the second cell as a secondary cell or a primary secondary cell of the terminal;
wherein the configuring the mobile IAB node to create a new cell as the second cell on a carrier comprises:
configuring the mobile IAB node to transmit discovery reference signals of the second cell and the first cell on the carrier in a frequency division multiplexing manner.

13. The method according to claim 11, wherein the configuring a mobile IAB node to configure a second cell as a secondary cell or a primary secondary cell of a terminal comprises:
in a case that the mobile IAB node supports at least two carriers and there is no inter-frequency cell, configuring the mobile IAB node to create a new cell as the second cell on an inter-frequency, and configuring the second cell as a secondary cell or a primary secondary cell of the terminal; or in a case that the mobile IAB node supports at least two carriers and there is an inter-frequency cell but the inter-frequency cell is a non-campable cell, configuring the mobile IAB node to reconfigure the inter-frequency cell as a campable cell for use as the second cell, and configuring the second cell as a secondary cell or a primary secondary cell of the terminal; or in a case that the mobile IAB node supports at least two carriers and there is a campable inter-frequency cell, configuring the mobile IAB node to use the inter-frequency cell as the second cell to configure the second cell as a secondary cell or a primary secondary cell of the terminal.

14. The method according to claim 7, wherein in a case that the first cell is a secondary cell, the performing a cell reconfiguration operation comprises:

configuring the mobile IAB node and the terminal to release the first cell; and configuring the mobile IAB node to create a new cell as the second cell on a carrier of the first cell, and configuring the second cell as a secondary cell of the terminal;

configuring the mobile IAB node to activate the second cell.

15. The method according to claim 7, wherein the configuring the mobile IAB node and the terminal to release the first cell comprises:

configuring the mobile IAB node to stop transmitting a discovery reference signal of the first cell; and configuring the terminal to release a connection with the first cell.

16. A network control node, comprising:
a processor; and
a memory storing a computer program that is capable of being run on the processor, wherein the computer program, when executed by the processor, performs the method of claim 7.

17. The network control node according to claim 16, wherein the performing a cell reconfiguration operation comprises:

in a case that a physical cell identifier (PCI) conflict occurs between the first cell and a surrounding cell or there is a potential PCI conflict, performing the cell reconfiguration operation.

18. The network control node according to claim 17, wherein before the performing a cell reconfiguration operation, the method further comprises:

in a case that a PCI conflict report that is transmitted by the mobile IAB node or the terminal and is about the first cell is received, determining that a PCI conflict occurs between the first cell and a surrounding cell; or in a case that it is detected that a PCI of the first cell is the same as a PCI of a surrounding cell, determining that a PCI conflict occurs between the first cell and the surrounding cell; or in a case that it is predicted that within a future specified time period, a PCI of the first cell is the same as a PCI of a cell in an area at which the mobile IAB node is about to arrive, determining that there is a potential PCI conflict in the first cell; or in a case that it is detected that a PCI of the first cell is the same as a PCI of a cell within a specified distance from the mobile IAB node, determining that there is a potential PCI conflict in the first cell.

19. The network control node according to claim 17, wherein in a case that the second cell is a new cell created by the mobile IAB node, the configuring a mobile IAB node to configure a second cell as a secondary cell or a primary secondary cell of a terminal comprises:

selecting a PCI that does not conflict with a PCI of the first cell; and configuring the mobile IAB node to use the non-conflicting PCI to create a new cell as the second cell.

* * * * *